June 15, 1954

L. D. ETHERINGTON 2,681,125

PROCESS FOR REMOVING DUST AND CONDENSIBLE VAPORS FROM GASES

Filed Aug. 30, 1952

Lewis D. Etherington Inventor

By W.O.T Heilman Attorney

Patented June 15, 1954

2,681,125

UNITED STATES PATENT OFFICE 2,681,125

PROCESS FOR REMOVING DUST AND CONDENSABLE VAPORS FROM GASES

Lewis D. Etherington, Cranford, N. J., assignor to Standard Oil Development Company, a corporation of Delaware Application August 30, 1952, Serial No. 307,300

9 Claims. (Cl. 183—114.2)

This invention concerns a method for recovering entrained solids and removing condensible vapor from at least two gas streams containing the same solid and condensible vapor. More particularly, it relates to a mehod for removing entrained solids from and dehumidifying two or more product gas streams produced when separating a mixture of gasiform hydrocarbons into various fractions by passing the mixture through a moving or fluidized bed of finely divided adsorbent. It has particular application to fractional adsorption processes in which the adsorbent is activated carbon and is present in the form of a fluidized bed of finely divided particles, and stripping steam is used to desorb products from the activated carbon.

It is well known to fractionate a mixture of gasiform hydrocarbons by contacting the mixture with an adsorbent such as activated carbon. This adsorbent has the property of selectively adsorbing hydrocarbons according to their molecular weights or chemical types. For example, where all of the components of a hydrocarbon mixture are of the same chemical type, activated carbon will adsorb a high molecular weight hydrocarbon in preference to a low molecular weight one. It is this property of activated carbon and other similar adsorbents that has been uptilized in fractionating gasiform hydrocarbon mixtures and in particular those mixtures of hydrocarbon gases that are not condensible at ordinary temperatures and pressures.

A brief description of a conventional process and apparatus for fractionally adsorbing a hydrocarbon gas mixture will be of assistance in pointing out the objects and advantages of the present invention. For the purpose of the ensuing description, it will be assumed that it is desired to fractionate a mixture of $C_1$, $C_2$, and $C_3$ hydrocarbons into individual $C_1$, $C_2$, and $C_3$ fractions. Mixtures such as this are commonplace in the petroleum industry where they are derived from a variety of producing and refining processes. The $C_1$ fraction includes methane and lighter gases; the $C_2$ fraction consists primarily of ethane and ethylene; and the $C_3$ fraction includes propane, propylene and small amounts of lighter and heavier boiling hydrocarbons. A typical refinery $C_1$—$C_2$—$C_3$ stream will contain about 10 to 15 volume per cent of $C_3$, 10 to 30 volume per cent of $C_2$, and the remainder methane and lighter boiling gases. It will be noted that hydrocarbon feed stocks other than this particular one, and operating conditions other than those to be stated can be employed without departing from the spirit of the present invention.

A conventional adsorptive fractionation process may be best described by referring to Figure 1 of the two figures that accompany this description.

Figure 1:
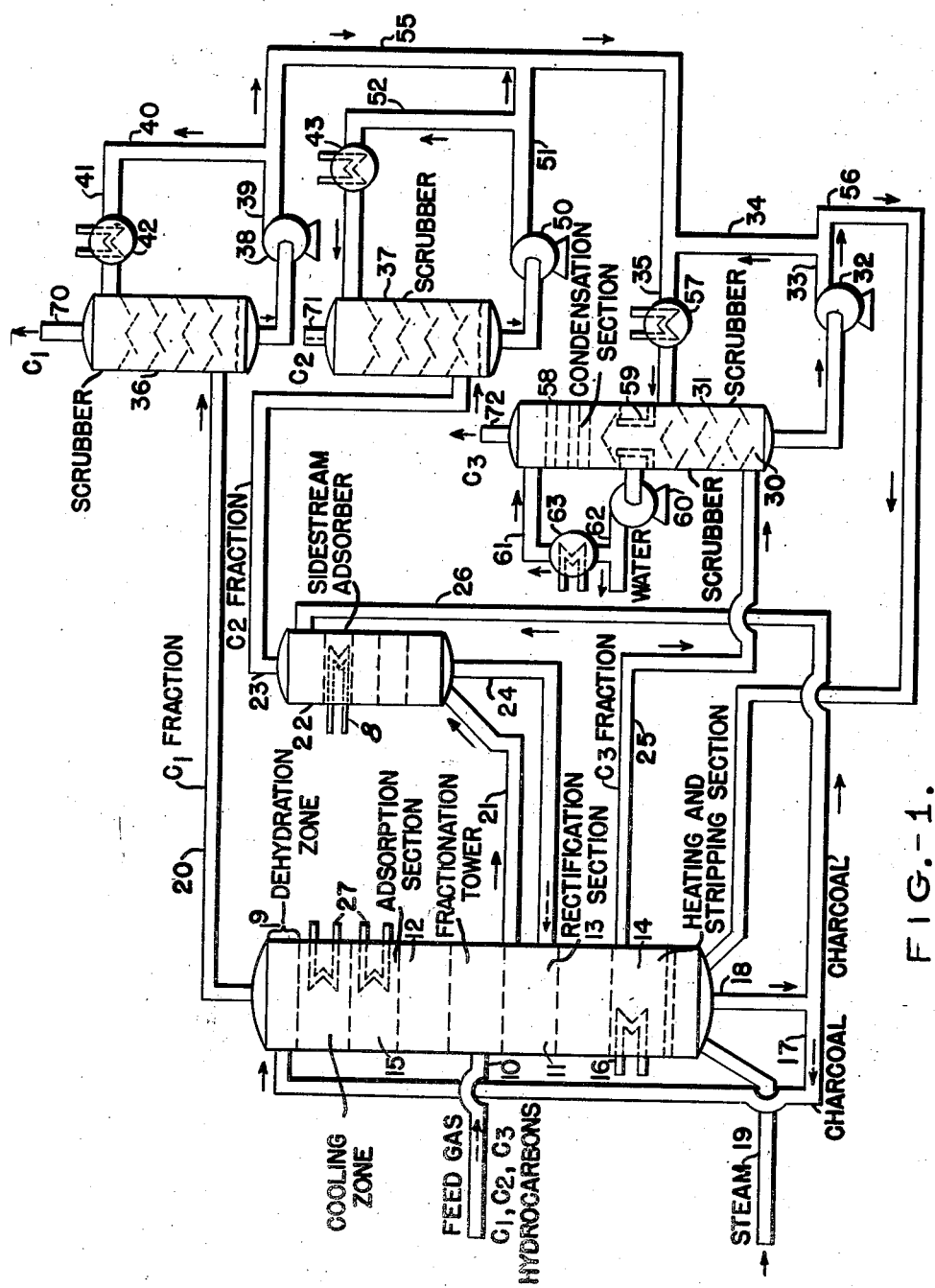
Figure 1 illustrates a conventional adsorptive fractionation system which has incorporated within it a recovery system that constitutes a preferred embodiment of the present invention.

Referring to Figure 1, a feed gas composed substantially of $C_1$, $C_2$, and $C_3$ hydrocarbons, flows through line 10 into tower 11 at an intermediate point. Tower 11 contains a dehydration zone 9, and adsorption section 12 containing a cooling zone 15, a rectification section 13, and a heating and stripping section 14. The adsorption section 12 is that portion of tower 11 that is disposed between the feed point and the top of the tower. This section effects the adsorption of the intermediate and heavier constituents from the feed gas.

Rectification section 13 lies immediately below the entry point of the feed gas, and it is in this section that less adsorbable constituents are stripped from more adsorbable constituents by upward moving reflux vapors.

Heating and stripping section 14 is positioned between rectification section 13 and the bottom of the tower. In this section of the tower, the most strongly adsorbed constituents of the feed are stripped from the adsorbent by means of a stripping medium such as steam introduced through line 19 in conjunction with heat supplied by heating means 16.

The feed gas, as it enters tower 11 contacts a moving fluidized bed of activated carbon, which flows from the top of the tower toward the bottom of the tower. The carbon employed is in finely divided form and conventionally has a particle size distribution about as follows:

Table 1

| Particle Size in Microns | Fluidized Bed Composition, wt. percent |
|---|---|
| 0–10 | 10 |
| 10–20 | 8 |
| 20–40 | 11 |
| 40–80 | 18 |
| 80+ | 53 |

The preferred particle size characteristics of any given adsorbent may vary materially from the above values. It is well known in the art of fluidizing solids that different materials require different particle size distributions for best fluidity.

As the feed gas rises through adsorption section 12, the $C_2$ and $C_3$ fractions being more adsorbable than the $C_1$ fraction are removed from the gas stream. The $C_1$ fraction continues to rise through tower 11 and eventually is withdrawn from the tower through overhead line 20.

The fluidized bed of activated carbon containing the $C_2$ and $C_3$ hydrocarbons moves downwardly from adsorption section 12 to rectification section 13 and thence to heating and stripping section 14. In the upper part of section 13, refluxing $C_2$ vapors selectively desorb $C_1$ hydrocarbons from the carbon. In the lower part the refluxing $C_3$ vapors similarly desorb $C_2$ hydrocarbons which are then withdrawn from rectification section 13 at an intermediate point through line 21. Inasmuch as this side stream $C_2$ fraction generally contains unavoidable equilibrium amounts of $C_3$ and heavier hydrocarbons, it is passed to a secondary fractional adsorption tower 22 for further rectification. A stream containing substantially pure $C_2$ hydrocarbons is removed from secondary tower 22 through overhead line 23.

Fluidized carbon passing downwardly through secondary tower 22 is withdrawn from the bottom of this tower through line 24 and flows back to the main adsorption tower 11.

The fluidized activated carbon bed in tower 11, meanwhile, continues to flow downwardly from rectification section 13 to heating and stripping section 14, wherein the $C_3$ hydrocarbons are removed from the carbon by combined heating and stripping means.

A stream containing substantially pure $C_3$ hydrocarbons plus the bulk of the stripping steam is withdrawn from the top of the heating and stripping section through line 25. This section of tower 11 is generally operated at temperatures of about 500° F.

The stripped carbon is withdrawn from the bottom of tower 11 through line 16 and a first portion of it is then recycled through line 17 to the top of tower 11. The second portion of the stripped carbon is recycled through line 26 to the top of tower 22.

Since the stripped carbon is at a temperature of about 500° F., it must be cooled before it can regain its ability to adsorb hydrocarbons. A conventional method for achieving such cooling consists in locating suitable cooling means 27 in the upper part of tower 11 and cooling means 8 in the upper part of tower 22.

It will be noted also that the carbon as it leaves the bottom of tower 11 contains an appreciable amount of adsorbed water vapor. To provide maximum carbon activity for the hydrocarbon separations, it is necessary that this adsorbed water vapor be removed. This objective is conventionally achieved in the topmost portion of tower 11, designated as the dehydration zone 9, where the rising $C_1$ hydrocarbons serve to strip the water vapor from the carbon. The carbon feed to tower 22 is similarly stripped of water by the $C_2$ product and cooled in the upper portion of tower 22. The bulk of the stripping steam appears in the $C_3$ product leaving tower 11 through line 25. The $C_1$ stream in line 20, the $C_2$ stream in line 23, and the $C_3$ stream in line 25 all contain relatively large amounts of water vapor and also substantial amounts of entrained particles of activated carbon. For example, a typical $C_1$ stream may contain from about 5 to 30 volume per cent of steam; a $C_2$ stream about 5 to 15 volume per cent of steam; and a $C_3$ stream about 50 to 90 volume per cent of steam. The water vapor and carbon contained in these streams must be separated from them in order to obtain the hydrocarbon fractions in relatively pure form. It is eminently desirable that the entrained carbon be recovered in a form that is suitable for immediate reintroduction within tower 11. Cyclone separators are conventionally employed to remove a large amount of the carbon in the streams, but additional methods must be employed to recover greater than 99.9% of the carbon as is required by the overall process. Depending upon the number of cyclones employed to make a preliminary separation and also upon the height of the draw-off point above the carbon bed, the various gas streams may contain as little as .1 pound of carbon per 1000 cubic feet of gas; but they will usually contain about 1 to 2 pounds of carbon per 1000 cubic feet of gas.

A number of methods have been suggested or employed in conjunction with cyclone separators for recovering the required amount of carbon and water vapor from the hydrocarbon streams described above. A particularly desirable method is one wherein a gas stream containing a non-condensing gas, a condensible vapor, and finely divided solids is first passed to conventional equipment such as cyclones which remove the bulk of the entrained solid but, unfortunately which are inadequate to effect the ultimate high recovery desired. The gas from the cyclones is then passed to a tower which is comprised of a scrubbing section and a condensation section. The feed gas in this instance is introduced to the bottom of the scrubbing section, where it is initially contacted with a recirculated slurry whose temperature and flow rate are controlled so as to remove all of the solids and a predetermined portion of the condensible vapors from the feed gas. Just enough of the vapors are condensed in the scrubbing section to provide the desired concentration of solids in the slurry resulting from the condensed vapors and the precipitated solids. This method has been described at length in pending patent application S. N. 307,270 filed by R. S. Wood on August 30, 1952.

The scrubbed and partially dehumidified feed gas from the lower scrubbing section then enters the dehumidification section wherein additional vapors are condensed from the gas in the substantial absence of any solids. The scrubbed and dehumidified non-condensing gas fraction is withdrawn from the top of the dehumidification section. Meanwhile, the vapors condensed in this section are separately collected and withdrawn from the bottom of this tower section for any further desired use.

An object of the present invention is to utilize the apparatus and method described above in a novel manner for the purpose of processing hydrocarbon gas streams such as the $C_1$, $C_2$, and $C_3$ product streams from an activated carbon fractional adsorption unit of a type described earlier in this specification. More particularly, it is an object of the present invention to integrate the scrubbing and dehumidification operations performed on a plurality of such streams so as to (1) recover at least 99.9% of the carbon contained in all of the gas streams as a single, pumpable carbon-water slurry of a character that can be directly reintroduced to the primary adsorption tower; (2) recover substantially all of the steam or water vapor as condensed water (except that water present in slurry form) in the form of a single stream; (3) separately recover the scrubbed and dehumidified $C_1$, $C_2$, and $C_3$ fractions; (4) avoid contamination of the various products with any extraneous materials; and (5) employ separate scrubbing zones for each of the gas streams but only one common condensation zone. The advantages of integrated operations in treating at least two separate feed gas streams will be apparent from the following discussion.

The present invention achieves its objects by making use of the fact that the bottoms fraction from a conventional activated carbon adsorption tower contains appreciably more water vapor than does the overhead fraction or any of the side stream fractions. For example, in the particular process partially described earlier in this specification and illustrated in attached Figure 1, the $C_1$ and $C_2$ fractions will contain less water vapor than the $C_3$ fraction. Furthermore, the total steam quantity in both the $C_1$ and $C_2$ fractions is usually more or less of the order desired to slurry the combined entrained carbon from $C_1$, $C_2$ and $C_3$ streams. On the other hand, the total steam in the $C_3$ fraction would be too great for this purpose. It will be noted that all of the fractions flow from adsorption towers 11 and 22 at approximately the same pressure.

Referring once more to Figure 1, the $C_3$ fraction in line 25 passes into the bottom of the scrubbing zone 30, which constitutes the lower section of the combined scrubbing and dehumidifying tower 31. Here the $C_3$ stream, which contains water vapor and entrained activated carbon, is countercurrently contacted with a recirculating water-carbon slurry, whereby the carbon contained in the $C_3$ stream is substantially completely removed. It can be seen that if the slurry formed in scrubbing zone 30 is continuously recycled by pump 32 through lines 33, 34, and 35 without any cooling or water addition to the slurry, the temperature of the slurry will gradually reach an equilibrium value corresponding to the adiabatic saturation temperature of the $C_3$ stream. It can further be seen that this condition would create a water deficiency in scrubbing section 30 due to the high temperature and sensible heat of the $C_3$ which would vaporize water, with the result that the carbon content of the slurry would soon become too great. This difficulty is used to advantage in the following manner: the $C_1$ and $C_2$ streams in lines 20 and 23 respectively are passed to scrubbing zones 36 and 37 respectively. Considering first the $C_1$ stream, the carbon and water vapor content in this stream are substantially completely and simultaneously removed in zone 36 by countercurrently contacting it with a recirculating carbon-water slurry that is withdrawn from the bottom of zone 36 by pump 38 and passed through lines 39, 40, and 41 and heat exchanger 42 to the top of this zone. The recirculating slurry is cooled sufficiently by indirect heat exchange with a coolant in exchanger 42, so as to substantially completely condense all of the water vapor contained in the $C_1$ stream. The carbon-water slurry produced by the operation within tower 36 is usually such that it is too dilute for direct introduction to tower 11.

The $C_2$ fraction in line 23 is dehumidified and scrubbed in zone 37 in a manner similar to that employed for the $C_1$ fraction. The slurry formed in zone 37 is withdrawn by pump 50 and is recirculated through lines 51 and 52 and heat exchanger 43 to the top of this zone. Once again this slurry is cooled sufficiently to substantially completely remove all of the water vapor contained in the $C_2$ stream, as well as to scrub all of the carbon particles from the stream. Again the slurry produced by this operation is too dilute, carbonwise, for direct use in fractionation tower 11. Accordingly, the net product portions of the dilute slurries formed in towers 36 and 37, over and above that required for the scrubbing and dehumidifying operations, are combined in line 55 and added to the recirculating slurry of tower 31 in line 35. In many instances, the water added to the recirculating slurry of tower 31 in this manner, less the water vaporized spontaneously in zone 30 of tower 31, will be within the range of the quantity of water desired to slurry the total carbon recovered from all three feed gases. In these cases, exchanger 57, the purpose of which is described below, will not be required. It will be noted that the product slurry containing the carbon recovered from all three feed gases is withdrawn through line 56. In the event, however, that the amount of water added via line 55 in the above-described manner is not sufficient to compensate for the water required in the product slurry, the recirculating slurry in line 35 can be cooled in direct heat exchanger 57, so as to control the spontaneous vaporization of water in zone 30, or even to partially condense a portion of the water vapor contained in the $C_3$ stream, whichever is required. Conversely, where the amount of water added to the recirculating slurry in line 35 via line 55 is greater than that required to compensate for that withdrawn as the product slurry in line 56, the combined slurries in line 35 can be heated or even boiled in heat exchanger 57, so as to vaporize the excess water which would then combine with the uncondensed water vapor already present in zone 30, and pass into section 58 of tower 31 where the combined water vapor is condensed in the absence of the carbon fines.

The water vapors or steam flowing into condensation section 58 are condensed by direct contact with previously condensed water that has been collected in tray 59 and recirculated by means of pump 60 through line 61 to the top of this section. The condensed water, recirculated in this manner, is cooled in indirect heat exchanger 63 to an extent such that it will substantially remove all of the water vapor contained in the $C_3$ stream as it passes through section 58. The net water produced in condensation section 58 is withdrawn from the operation through line 62. It will be noted that this water is substantially free of carbon and contaminants such as salts and the like, and therefore may be employed for generating steam or other purposes requiring water of this quality. It will further be noted that the $C_1$, $C_2$, and $C_3$ product streams withdrawn through lines 70, 71 and 72 are substantially free of both carbon and water vapor.

The advantages of the present process over a process using a separate scrubbing and dehumidifying tower similar to tower 31 for each of several hydrocarbon streams are apparent. In the latter process, each of towers 31, 36, and 37 would contain a solids scrubbing section, a condensation section, two exchangers, two operating pumps, and, according to usual practice, two spare pumps unless the relative capacities of the two operating pumps permits the use of one common spare pump. Thus, the present invention saves a condensation tower section, an exchanger, an operating pump, a spare pump for the general case, and related auxiliaries such as instruments, for each of all feed gas streams treated except one. For this one feed stream as treated in tower 31, exchanger 57 is also saved in many cases, as discussed above.

Experimentation has shown that the carbon-water slurry in line 56 usually must contain at least about 0.2 lb. of carbon per gallon of slurry and no more than about 0.5 lb. of carbon per gallon of slurry, in order that the slurry will be pumpable and can be directly introduced into fractionation tower 11 without impairing the operation of this tower. As shown in Figure 1, a slurry meeting these requirements is preferably added to adsorptive fractionation tower 11 at a point within heating and stripping section 14. The hot fluidized char in section 14 will boil the water from the slurry to liberate the carbon and the boiled slurry water will serve as stripping steam. However, excessive slurry water would cool the adsorbent in tower 11 too much, resulting in impaired desorption and carbon dehydration efficiencies. However, if the slurry is too concentrated, carbonwise, it will not be readily pumpable. To illustrate the mode for operating the process incorporated in the present invention, the handling of $C_1$, $C_2$, and $C_3$ streams having the following characteristics will be considered.

*Table 2*

| Gas Stream Descriptions | Gas Streams | | |
|---|---|---|---|
| | $C_1$ Stream | $C_2$ Stream | $C_3$ Stream |
| Feed Rate, Lb.-Mols per hour | 8,840 | 2,900 | 4,760 |
| Temperature, °F | 400 | 400 | 500 |
| Pressure, p. s. i. g | 70 | 70 | 75 |
| Water Vapor, mol. percent | 16.6 | 6.3 | 87.2 |
| Carbon, lbs. per 1,000 cu. ft | 0.55 | 0.50 | 0.81 |

A typical particle size distribution for the activated carbon entrained in the gas streams above is as follows:

*Table 3*

| Particle Size, Microns | Entrained Carbon Composition, wt. percent |
|---|---|
| 0-10 | 46 |
| 10-20 | 19 |
| 20-40 | 16 |
| 40-80 | 14 |
| 80+ | 5 |

It will be noted that the values given in Table 2, while typical, are affected by the type of carbon or adsorbent employed as well as the velocity of the gases through the adsorption towers.

The $C_1$ stream is contacted with 1550 gallons per minute of recirculating carbon-water slurry in tower 36. A slurry is withdrawn from the bottom of the tower at a temperature of about 180° F. and re-enters the top of the tower at a temperature of about 120° F.

The $C_2$ stream is similarly contacted with 455 G. P. M. of recirculating carbon-water slurry in tower 37 which is withdrawn from the tower at a temperature of 180° F. and recirculated to the top of the tower at a temperature of about 120° F.

47.5 gallons per minute of slurry from tower 36 and 5 gallons per minute of slurry from tower 37 are combined in line 55. The first named slurry contains about 0.1 lb. carbon per gallon, while the latter slurry contains about 0.4 lb. carbon per gallon of slurry.

The $C_3$ stream is contacted with 1500 gallons per minute of recirculating slurry and with 52.5 gallons per minute (G. P. M.) of the combined slurry in line 55 in tower 31. The slurry withdrawn from the bottom of this tower will have a temperature of about 315° F., while the combined slurry entering the top of the tower will have a temperature of about 314° F. Under these conditions, about 12.5 G. P. M. of water are vaporized spontaneously in zone 30 of tower 31 when exchanger 57 is not used. This leaves 52.5 minus 12.5 or 40 G. P. M. water to slurry the total recovered carbon, which results in a concentration of about 0.5 lb. carbon per gallon of slurry. This concentration is allowable for both pumping and for introduction into tower 11 via line 56. Thus exchanger 57 is not required.

1600 G. P. M. of steam condensate at 240° F. are removed from the bottom of zone 58 of tower 31, about 175 G. P. M. of this stream are removed as net product via line 62, and the remainder is recirculated at 120° F. via line 61 and exchanger 63 at 120° F. to the top of zone 58. The $C_1$, $C_2$, and $C_3$ streams leave towers 36, 37, and 31 respectively at 120° F. and containing small allowable equilibrium quantities of water vapor.

It will be appreciated that the present invention may also apply to dusty gases in which the condensing vapor is a hydrocarbon instead of steam, and the recirculated slurries and solids-free condensate comprises an oil or a hydrocarbon fraction of the feed gases instead of water. It will be further noted that substantial changes in the operating conditions, number of gas streams, number of towers, etc. can be modified or changed without departing from the scope of the invention. In another modification of the invention, cooling water from a cooling water source, such as a cooling water tower system, may be used in zone 58 of tower 31 for directly condensing water vapor instead of indirectly via exchanger 63 and recycle condensate in line 61. In this modification, exchanger 63 and line 61, and, in certain cases, pump 60 would be eliminated. The cooling water leaving zone 58 via line 62, containing the condensed water vapor, would return to the cooling water system. The condensate would substitute for cooling water makeup usually required in standard cooling water systems. Ordinary cooling water usually contains mineral salts which would contaminate activated carbons. However, the use of direct cooling water in zone 58 is permissible since this water does not contact the carbon.

As another alternate, some of the slurry in line 56 from pump 32, or some of the condensate in line 62 from pump 60, may be sent to towers 36 and 37 by means of lines 49 and 52 respectively. For example, if the solids-to-condensible vapor ratio in line 23 is such that the slurry in line 51 is too concentrated in carbon to be readily pumpable, even with the total condensable vapor feed liquified in tower 37, then the alternate as just described would remedy this condition. At the same time, it may be desirable to increase the cooling at exchanger 57 to provide additional condensate for this purpose. As another alternate, there may be more than one tower of operation and construction similar to tower 31 in integrated operation with one or more towers similar in construction and operation to towers 36 and 37. Also, a wetting agent, not resulting in permanent damage to the recovered solid, may be added to the scrubbing sections of the various towers to improve the efficiency of solids removal. These tower scrubbing sections may be equipped with packing, plates, baffles of the disk-and-donut type and other means of staging fines removal and heat exchange between feed gases and recycled slurries.

Figure 2:
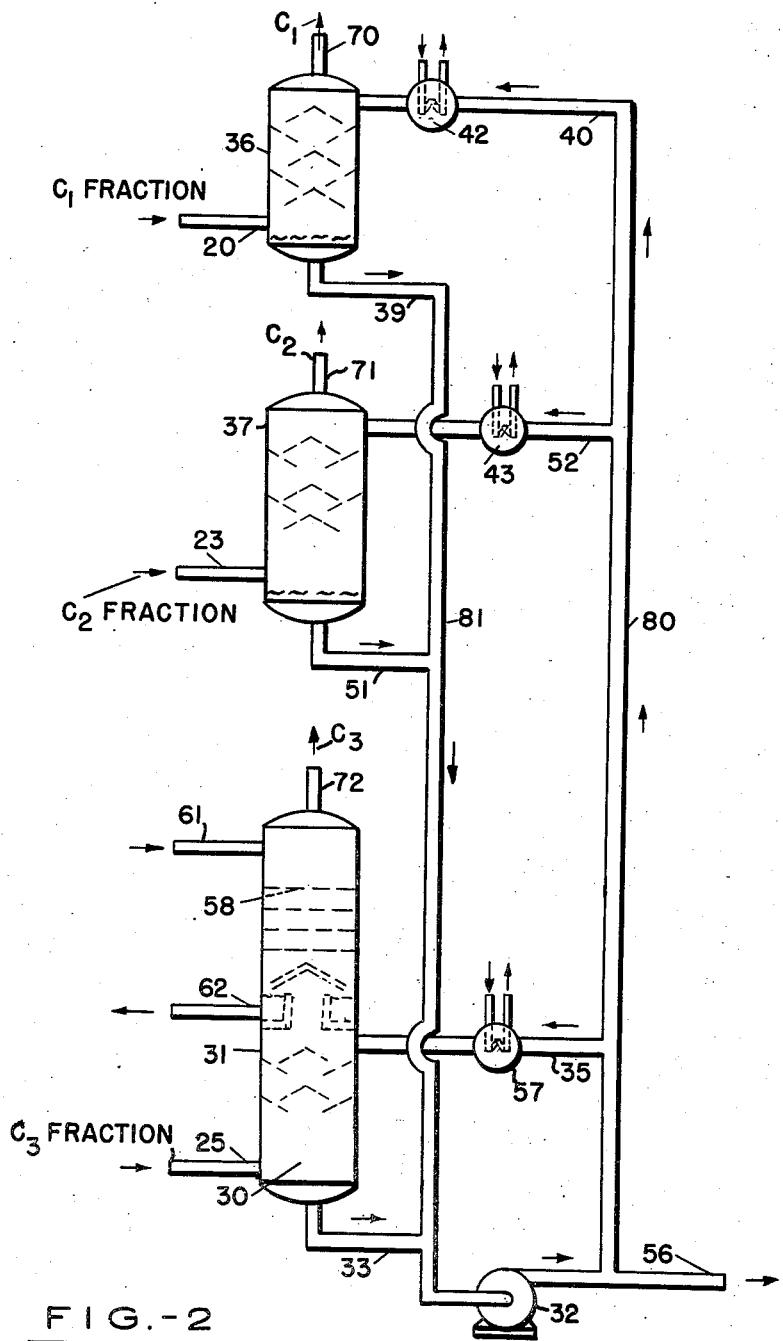
Figure 2 illustrates an alternative recovery system which constitutes another embodiment of the present invention.

In still another variation of the present process, a single common slurry recycle pump may be used for two or more towers such as towers 36 and 37 instead of a separate pump for each tower, providing the tower pressures and other conditions permit. This procedure would reduce the required number of pumps and tend to correct the condition of slurry water deficiency that might occur in one or more towers containing a single contacting section. Such a procedure is illustrated in Figure 2 which depicts another embodiment of the present invention employing a single slurry pump and a common slurry system. It will be noted that the conventional pieces of apparatus shown in Figure 1 are not shown in Figure 2. It will be further noted, however, that any of the pieces of apparatus in Figure 1 that are also shown in Figure 2 are designated by the same characters in both figures.

In discussing Figure 2 it will be assumed that the apparatus shown therein is being employed for the same process and streams as were described in conjunction with Figure 1. Thus, the $C_1$ stream of Figure 1 enters scrubbing zone 36 in Figure 2 where its carbon and steam vapor contents are substantially completely and simultaneously removed by contact with a carbon-water slurry that enters the zone via line 40. Similarly, the $C_2$ stream of Figure 1 enters scrubbing zone 37 of Figure 2 where it is substantially completely and simultaneously freed of its water and carbon constituents by the carbon-water slurry that enters this zone via line 52.

The $C_3$ stream enters the scrubbing zone 38 of tower 31 where the carbon contained in the stream is substantially removed therefrom by contact with a recirculating water-carbon slurry that enters through line 35.

The slurries produced in zones 36, 37 and 38 are combined in line 81 and pass to pump 32. From pump 32 the combined slurry passes into line 81 with the exception of the product slurry which is withdrawn through line 56.

A first portion of the slurry in line 80 flows through line 40 and cooler 42 into zone 36 where it scrubs the $C_1$ stream and thereby forms additional slurry. The volume and temperature of the slurry in line 41 are regulated so as to remove substantially all of the carbon and water vapor contained in the $C_1$ stream.

Similarly, another portion of the slurry in line 80 is cooled in exchanger 43 and passes via line 52 into zone 37. The temperature and volume of the slurry in line 52 are again controlled so as to scrub substantially all of the water vapor and carbon from the $C_2$ stream.

Finally, another portion of the slurry in line 80 is passed via line 35 and exchanger 57 into zone 38. The volume and temperature of this slurry portion are regulated so that the water content of the combined slurry in line 81 is the amount desired in the product slurry of line 56. As explained earlier in connection with Figure 1, it may be necessary in some instances to heat the slurry passing through exchanger 57 in order to produce a slurry in line 56 of the water content desired. In other instances it may be necessary to cool the slurry passing through exchanger 57. But, in either event uncondensed water vapor in zone 38 flows into condensation section 58 where it is substantially completely condensed.

In reexamining the embodiment of the present invention that is illustrated in Figure 2, it will be observed that this embodiment performs the same functions and realizes the same objectives as the embodiment in Figure 1. The embodiment in Figure 2, however, differs from the embodiment in Figure 1 in that it utilizes merely one slurry pump and a common slurry system for all of the scrubbing zones, etc.

It will be noted that the term activated carbon, as used herein, is intended to include carbons such as activated cocoanut charcoal, bone char, wood char, synthetic coke, and the like.

It will further be noted that for the purposes of the present invention it is preferred that the non-condensing gases be substantially insoluble in the condensed vapors at the conditions under which the various scrubbing zones are operated.

What is claimed is:

1. A process for removing entrained solid particles and condensable vapor from a plurality of gasi-form streams each of which also contains a non-condensing gas and wherein one of the streams is relatively rich in condensable vapor and each of the other streams is relatively lean in condensable vapor which comprises in combination scrubbing each of said lean streams in a first vapor-liquid contacting zone with a first portion of a first slurry, each lean stream having its own said first contacting zone and its own said first slurry, each said first slurry consisting of liquid derived from the condensable vapor contained in its respective said lean stream and of solid particles also derived from its respective said lean stream, each said first portion of each said first slurry being present in a volume and temperature sufficient to remove substantially all of the entrained solid particles and condensable vapor in its respective lean stream in the form of its respective said first slurry, cooling and recirculating each said first portion of each said first slurry to its respective said first contacting zone, withdrawing and combining the remaining portion of each said first slurry with a first portion of a second slurry, contacting the resulting slurry with said gasiform stream relatively rich in condensable vapor in a second vapor-liquid contacting zone, said resulting slurry being present in a volume and temperature sufficient to substantially remove all of the entrained solid particles and a first portion of the condensable vapor contained in said vapor-rich stream in the form of said second slurry, recirculating said first portion of said second slurry, withdrawing the remaining portion of said second slurry as a product slurry, said second slurry and each of said first slurries being capable of being pumped and possessing a liquid to solids weight ratio equal to or less than the condensable vapor to solids weight ratio existing in each slurry's respective gasiform stream, cooling the substantially solids-free rich stream in a third zone to condense out substantially all of the condensable vapor remaining in this stream, withdrawing the resulting condensate as a product liquid and withdrawing the resulting scrubbed and dehumidified gasiform streams as separate non-condensing gases.

2. A process for fractionating a mixture of $C_1$, $C_2$ and $C_3$ hydrocarbons into separate $C_1$, $C_2$ and $C_3$ streams and for scrubbing and dehumidifying these streams which comprises contacting said mixture with a fluidized bed of activated carbon in a tower including an adsorption section, a rectification section and a desorption section to form a $C_1$ stream containing steam and entrained carbon particles, a $C_2$ stream containing steam and entrained carbon and a $C_3$ stream containing steam and entrained carbon, scrubbing said $C_1$ stream in a first vapor-liquid contacting zone with a first portion of a first slurry consisting of water derived from the steam contained in said $C_1$ stream and of carbon also derived from said $C_1$ stream, said first portion of said first slurry being present in a volume and temperature sufficient to remove substantially all of the entrained carbon and steam from said $C_1$ stream in the form of said first slurry, cooling and recirculating said first portion of said first slurry to said first contacting zone and withdrawing the remaining portion of said first slurry, scrubbing said $C_2$ stream in a second vapor-liquid contacting zone with a first portion of a second slurry consisting of water derived from the steam contained in said $C_2$ stream and of carbon also derived from said $C_2$ stream, said first portion of said second slurry being present in a volume and temperature sufficient to remove substantially all of the entrained carbon and steam from said $C_2$ stream in the form of said second slurry, cooling and recirculating said first portion of said second slurry to said second contacting zone and withdrawing the remaining portion of said second slurry, combining the remaining portions of said first and second slurries with a first portion of a third slurry and contacting the resulting slurry with said $C_3$ stream in a third vapor-liquid contacting zone, said resulting slurry being present in a volume and temperature sufficient to substantially remove all of the carbon and a first portion of the steam contained in said $C_3$ stream in the form of said third slurry, recirculating said first portion of said third slurry, withdrawing the remaining portion of said third slurry as a product slurry and pumping said product slurry to said desorption zone, cooling the substantially carbon-free $C_3$ stream in a fourth zone to condense out substantially all of the steam remaining in this stream, withdrawing the resulting water and withdrawing the resulting dehumidified and substantially carbon free $C_1$, $C_2$ and $C_3$ streams as separate $C_1$, $C_2$ and $C_3$ fractions.

3. Process as defined in claim 2 wherein the $C_1$ stream contains about 5 to 30% by volume of steam, the $C_2$ stream contains about 5 to 15% by volume of steam and the $C_3$ stream contains about 50 to 90% by volume of steam and all three of these streams contain less than about 2 pounds of carbon particles per 1000 cu. ft. of gasiform constituents.

4. Process as defined in claim 2 wherein the product slurry contains from about .2 to .5 pound of carbon particles per gallon of slurry.

5. Process as defined in claim 2 wherein the steam condensed in the fourth zone is condensed by contacting the substantially carbon-free $C_3$ stream directly with a portion of the water that has previously been withdrawn from said fourth zone, cooled and recirculated to said fourth zone.

6. A process for removing entrained solid particles and condensible vapors from a plurality of gasiform streams wherein the solids are removed in the form of a single pumpable slurry product comprised of said solid particles and said condensible vapors in condensed form, each of said gasiform streams containing a non-condensing gas and said solid particles, the total amount of condensible vapor in the streams being greater relative to the total amount of solid particles than the amount of liquid desired in the slurry product, at least one of said streams being rich in that it contains a relatively low ratio of liquid to solids and at least one of said streams being lean in that it contains a relatively high ratio of liquid to solids which comprises in combination directly scrubbing and cooling each of said rich streams in a first vapor-liquid contacting zone to remove substantially all of the condensible vapors and solid particles in each said rich stream in the form of a first slurry, each of said rich streams having its own said first contacting zone and its own said first slurry, directly cooling and scrubbing each of said lean streams in a second vapor-liquid contacting zone to remove substantially all of the entrained solid particles therein contained in the form of a second slurry, each said lean stream having its own said second contacting zone and its own said second slurry, passing said first and second slurries to a common slurry system from which portions of said first and second slurries are passed to said first and second contacting zones to serve as scrubbing media therein, controlling the temperature of said portions passed to each said second contacting zone so as to adjust the ratio of said condensed vapors to said solid particles at a point within said slurry system at the ratio desired in said slurry product and withdrawing said slurry product at this point, cooling each scrubbed lean stream in its own separate cooling zone to condense substantially all of the condensible vapors remaining therein, withdrawing the resulting condensates formed in said cooling zones, and separately withdrawing the resulting non-condensing gases substantially free of condensible vapors and solid particles from each of said first vapor-liquid contacting zones and each of said cooling zones.

7. Process as defined in claim 6 in which the non-condensing gases are substantially insoluble in the condensed vapors under operating conditions.

8. Process as defined in claim 6 in which at least one of the portions of the first slurries is cooled and passed to at least one of the first vapor-liquid contacting zones.

9. Process as defined in claim 6 wherein substantially all of the condensible vapors remaining in each scrubbed lean stream are condensed by direct contact with previously condensed vapors that have been cooled and recirculated to the cooling zones.

References Cited in the file of this patent

UNITED STATES PATENTS

| Number | Name | Date |
|---|---|---|
| 2,323,047 | Jewell | June 29, 1943 |
| 2,523,149 | Scheeline | Sept. 19, 1950 |
| 2,584,296 | Scheeline | Feb. 5, 1952 |
| 2,585,659 | Kilpatrick | Feb. 12, 1952 |